I. W. MASON.
INSECT KILLER.
APPLICATION FILED DEC. 4, 1915.

1,239,501. Patented Sept. 11, 1917.

WITNESSES
Edw. S. Hall.
J. P. Campbell

INVENTOR
Irving W. Mason.
BY Richard B. Owen.
ATTORNEY

UNITED STATES PATENT OFFICE.

IRVING W. MASON, OF ABERDEEN, WASHINGTON.

INSECT-KILLER.

1,239,501. Specification of Letters Patent. Patented Sept. 11, 1917.

Application filed December 4, 1915. Serial No. 65,063.

*To all whom it may concern:*

Be it known that I, IRVING W. MASON, a citizen of the United States, residing at Aberdeen, in the county of Grays Harbor and State of Washington, have invented certain new and useful Improvements in Insect-Killers, of which the following is a specification.

My invention relates to new and useful improvements in insect killers and more particularly to an electric insect killer.

The primary object of the invention is the provision of an insect killer which is simple and inexpensive in construction and which may be carried by globes or light shades of various characters.

A further object of the invention is the provision of an insect killer which may be attached to and carried by a cover for plates or vessels of various characters.

Figure 1:
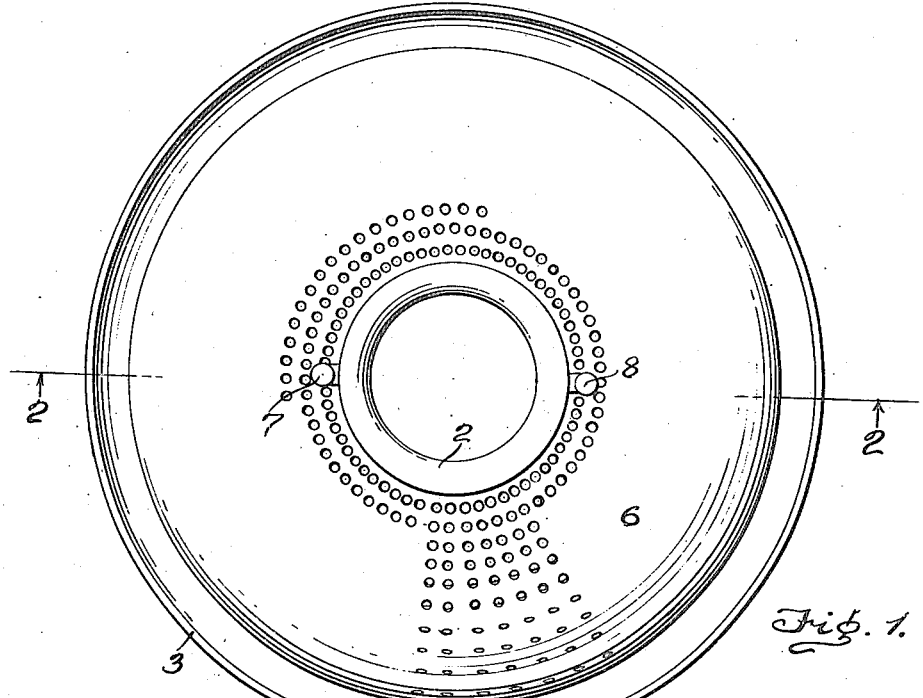
Figure 2:
Figure 3:
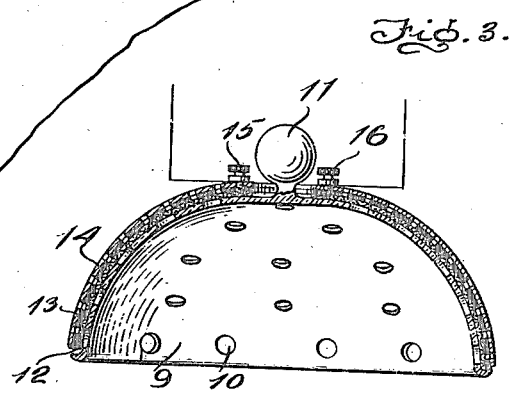

With these and other objects in view the invention consists in the novel details of construction and arrangement of parts which will be more clearly understood from the following description and drawings, in which, Figure 1 is a top plan view showing my invention applied to a light globe, Fig. 2 is a fragmental cross section through the killer and globe, and Fig. 3 is a cross section of a slightly modified form of my invention showing the killer attached to a cover for dishes or other vessels.

As stated in the objects of my invention it is my purpose to provide an electric insect killer which may be carried by globes or light shades of various characters or by covers for vessels or dishes and said killer comprises an element in itself which may be removed from the article upon which it is used and transferred at will.

In the drawings the numeral 1 indicates a globe or light shade having the rolled neck 2 at the top whereby it may be attached to any suitable light. The lower edge of the shade is curved as indicated to form a trough 3. My insect killer comprises a copper plate 4 which is of such a shape as to conform to the curvature of the article upon which it is to be used. A perforated insulating strip 5 is secured to the copper plate 4 and a perforated brass plate 6 is secured to the insulating strip, the perforations in said brass plate registering with the perforations in the insulating strip, as is more particularly shown in Fig. 2 of the drawings. An electric wire is connected to the copper plate by means of the binding posts 7 and an electric wire is connected to the brass plate by means of the binding posts 8.

In the above form of my invention should an insect light upon the brass plate 6 its legs will pass through the perforations in the brass plate and insulating plate 5 and contact with the copper plate 4. There will be a short circuit and the insect will be immediately killed. The insect will then drop into the trough 3 from which it can be removed at will.

In Fig. 3 of the drawings, I have shown a slightly modified form of my invention in which the insect killer is attached to a cover for a dish or other vessel containing articles of food. In this form of my invention, the cover is indicated at 9 and has a plurality of perforations 10 therein. A knob 11 or other suitable handle is connected to the top of the cover whereby it may be removed and carried from place to place. In this form of my invention I provide a strip of wire fabric indicated at 12 and said fabric is of such a shape as to conform to the curvature of the cover 9. A perforated strip of insulating material 13 is secured to the wire fabric 12 and the perforated brass plate 14 is secured to the insulating material 13, the perforations therein registering with the perforations in the insulating strip. An electric wire is connected with the brass plate 14 by means of the binding posts 15 and an electric wire is connected to the wire fabric 12 by means of a binding post 16. In this form of my invention when an insect lights upon the killer, the feet will pass through the perforations in the plate 14 and insulating strip 13 and contact with the wire fabric 12. A short circuit will occur and the insect will be immediately killed. It will be seen that by providing the wire fabric in connection with the perforated insulating strip and brass plate that the odor from the vessel on which the cover is used will pass therethrough and the insect will be attracted thereby.

From the above detailed description of my invention, it will be seen that I have provided an electric insect killer which is simple in construction and which may be used upon various articles. It will be noted that the killer is in no way permanently attached to the article, but may be transferred from one article to another. My insect killer is preferably used in connection with the Edison three-wire system, whereby the highest voltage may be secured.

Having thus fully described my invention what I claim as new and desire to secure by Letters Patent is:

1. An insect killer comprising a base plate, a perforated insulating strip secured to the base plate, a perforated plate secured to the insulating strip, and an electric contact secured to the base plate and an electric contact secured to the perforated plate.

2. The combination with a globe having a trough formed thereon, of an insect killer, said insect killer comprising a base plate, a perforated insulating strip secured to the base plate, a perforated plate secured to the insulating strip, an electric contact connected to the base plate, and an electric contact connected to the perforated plate.

3. An electric insect killer comprising a semiglobular base plate provided with a central opening adapted to encircle the curled top portion of a lamp globe, a perforated insulating strip with an opening secured to the base plate, a perforated plate having an opening and connected to the insulating strip, the base plate provided with an integral curled tab extending up and over the perforated plate and having a centrally threaded opening to receive a binding post, a perforated plate provided on the opposite side of the opening in the base plate with an integral curled tab extending up and over the perforated plate and provided with a centrally threaded opening to receive the other binding post.

In testimony whereof I affix my signature in presence of two witnesses.

IRVING W. MASON.

Witnesses:
 E. W. HUNTER,
 W. C. HULING.